United States Patent
Durai et al.

(10) Patent No.: US 10,090,970 B2
(45) Date of Patent: Oct. 2, 2018

(54) METHOD AND TEST SYSTEM FOR TESTING WIRELESS LAN DEVICES

(71) Applicant: Rohde & Schwarz Asia Pte. Ltd., Singapore (SG)

(72) Inventors: Rajashekar Durai, Singapore (SG); Gerson Bacor, Singapore (SG); Michael Allwang, Zolling (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 104 days.

(21) Appl. No.: 14/643,185

(22) Filed: Mar. 10, 2015

(65) Prior Publication Data
US 2015/0257019 A1    Sep. 10, 2015

(30) Foreign Application Priority Data

Mar. 10, 2014 (SG) ............................. 10201400508T
Mar. 24, 2014 (EP) .................................... 14161281

(51) Int. Cl.
*H04L 1/18* (2006.01)
*H04L 1/24* (2006.01)
*H04W 84/12* (2009.01)

(52) U.S. Cl.
CPC ............... *H04L 1/188* (2013.01); *H04L 1/24* (2013.01); *H04W 84/12* (2013.01)

(58) Field of Classification Search
CPC .......... H04L 1/188; H04L 1/24; H04W 84/12
USPC ...................................................... 370/252
See application file for complete search history.

(56) References Cited

U.S. PATENT DOCUMENTS

| | | | |
|---|---|---|---|
| 5,931,961 A * | 8/1999 | Ranganathan | G06F 11/1443 340/514 |
| 6,717,915 B1 * | 4/2004 | Liao | H04L 29/06 370/252 |
| 7,898,958 B2 * | 3/2011 | Wu | H04L 1/1835 370/235 |
| 8,503,340 B1 * | 8/2013 | Xu | H04W 84/12 370/310 |
| 8,972,569 B1 * | 3/2015 | D'Esposito | H04L 41/5067 709/224 |
| 9,386,127 B2 * | 7/2016 | Dajani | H04L 69/16 |
| 2002/0089959 A1 * | 7/2002 | Fischer | H04L 1/08 370/338 |

(Continued)

FOREIGN PATENT DOCUMENTS

EP         1724684         11/2006

OTHER PUBLICATIONS

Bianchi et al., "Experimental assessment of the backoff behavior of commercial IEEE 802.11b network cards", INFOCOM 2007, 26th IEEE International Conference on Computer Communications, May 6-12, 2007, p. 1181-1189.

(Continued)

*Primary Examiner* — Asad Nawaz
*Assistant Examiner* — Saad A Waqas
(74) *Attorney, Agent, or Firm* — Lee & Hayes, PLLC

(57) ABSTRACT

The invention relates to a technique for especially testing an IEEE 802.11 WLAN device, in particular for testing performance compliance of the device. According to a method aspect to be performed by a test system, exchange of an ICMP message pair is initiated between the device under test (DUT) and the test system; and a backoff time selected by the DUT during the message exchange is determined.

15 Claims, 11 Drawing Sheets

(56) References Cited

U.S. PATENT DOCUMENTS

| | | | |
|---|---|---|---|
| 2003/0161341 A1 | 8/2003 | Wu et al. | |
| 2005/0058151 A1* | 3/2005 | Yeh | H04W 52/46 370/445 |
| 2006/0184664 A1* | 8/2006 | Jung | H04L 47/10 709/224 |
| 2011/0149720 A1* | 6/2011 | Phuah | H04L 12/2697 370/216 |
| 2011/0239073 A1* | 9/2011 | Imai | H04L 1/188 714/748 |
| 2012/0163218 A1* | 6/2012 | Kim | H04W 74/08 370/252 |
| 2013/0204965 A1* | 8/2013 | Masputra | H04L 47/60 709/217 |
| 2015/0295802 A1* | 10/2015 | Balakrishnan | H04L 43/0811 370/248 |

OTHER PUBLICATIONS

Jakubiak, Jacob et al., "Precise Delay Analysis for IEEE 802.11 Legacy Ad-Hoc Networks", IEEEVTS Vehicular Technology Conference, Proceedings, IEEE, US, Apr. 1, 2007, pp. 2956-2960.

\* cited by examiner

METHOD AND TEST SYSTEM FOR TESTING WIRELESS LAN DEVICES

PRIORITY

This application claims priority of Singaporean patent application SG10201400508T filed on Mar. 10, 2014, which is incorporated by reference herewith.

FIELD OF THE INVENTION

The invention relates to a method of testing a device, especially a wireless LAN device, more especially a device using standard IEEE 802.11, in particular for testing performance compliance of the device, and to a corresponding computer program and test system.

BACKGROUND OF THE INVENTION

Increasing demand for wireless connectivity has brought a continued surge in wireless traffic data and congestion in wireless environments. Wireless LAN (WLAN) is widely employed for wireless data transfer and is available on nearly any kind of wireless devices, which results in more and more traffic over-the-air in congested WLAN bands.

WLAN is especially but not exclusively used herein as synonymous or comprising the IEEE 802.11 set of standard specifications. IEEE 802.11 defines amongst others a set of Media Access Control (MAC) and Physical Layer (PHY) specifications for implementing WLAN computer communications in the 2.4, 3.6, 5 and 60 GHz frequency bands. The standards provide the basis for wireless network products such as those using the Wi-Fi brand.

WLAN is based on "Carrier Sense Multiple Access with Collision Avoidance" (CSMA/CA), operating in the Data Link Layer, which is a network multiple access method for data transmissions. According to 'Carrier Sense', prior to transmitting a node listens to wireless signals to determine whether or not another node is currently transmitting on the channel. When a node transmits, it transmits all the packet data to be transmitted in its entirety.

Nodes attempt to avoid collisions by transmitting only when the channel is sensed to be idle. According to the 'Collision Avoidance' approach of CSMA/CA, the channel is intended to be about equally divided among all transmitting nodes within the collision domain. If another node is detected transmitting, the node waits for a time span before attempting again to access the channel.

IEEE 802.11 devices use a 'Distributed Coordination Function' (DCF). DCF is defined in subclause 9.2 of the IEEE 802.11 standard and is the de facto default setting for Wi-Fi hardware, for example. DCF requires a station wishing to transmit to listen for the channel status for a predefined fixed time span, the DCF Interframe Space Interval (DIFS). If the channel is found busy during the DIFS interval, the station defers its transmission. In order to avoid collisions between multiple stations contending for the medium, DCF further specifies a random backoff time or 'backoff', which forces a station to defer its access to the channel for a further, extra period. The length of the backoff period is determined by a random number between zero and a given maximum number defining multiples of a predefined fixed slot time.

The maximum number multiplied by the slot time defines the 'contention window', from within which the station randomly selects its (next) access attempt. The contention window size increases with the retransmission attempts. DCF further implements an 'exponential backoff' scheme, according to which the window size is multiplicatively increased. Typically a binary scheme is applied, i.e. the maximum number of time slots may increase from a minimum contention window size (CW_min) of, e.g., 7 time slots for the initial transmission attempt to 15, 31, 63, 127, 255, . . . for the first, second, third, fourth, fifth, . . . retransmission attempts.

DCF includes a positive acknowledge scheme in the MAC layer, which means that if a frame is successfully received by the destination it is addressed to, the destination needs to send an acknowledgement frame (ACK frame) to notify the source of the successful reception.

The backoff mechanism significantly reduces the number of collisions and retransmissions in case of increasing number of devices. However, from the point of view of one of these devices, the random numbers to be used for (re) transmission attempts impact the performance. The larger the random numbers, the longer the backoff times, and the higher the chances of avoiding collisions and allowing other devices to access the channel; however this comes at the cost of decreasing effective data throughput. The smaller the random numbers, the shorter the backoff times and the smaller the intervals between consecutive data transmissions of the device, i.e. the higher the device's data throughput and performance.

There is a high demand for data throughput, illustrated for example with the emergence of new technologies like IEEE 802.11ac which is designed for very high throughput.

The IEEE 802.11 standards only provide for technical specifications but do not prescribe how to implement features. WLAN devices could be tested in order to, for example, characterize them according to their performance.

Bianchi et al., "Experimental assessment of the backoff behavior of commercial IEEE 802.11b network cards", IEEE INFOCOM 2007, proceeding of the 26th IEEE International Conference on Computer Communications, 6-12 May 2007, p. 1181-1189, discloses an experimental characterization of the backoff operations of a plurality of network interface cards. Low-level backoff distribution measurements are taken. Non-standard backoff behavior is detected, e.g. in terms of minimum contention window size. Further, some of the cards seem to suffer from implementation limits in either the card hardware/firmware and/or the software drivers.

It therefore turns out from Bianchi et al. that WLAN devices may show different performance and may especially not perform as expected in terms of, e.g., backoff operation. Therefore there is in fact a need for efficient techniques for testing performance compliance of WLAN devices.

Backoff time is randomly selected within the contention window each time, which requires a comprehensive technique for backoff time measurement and analysis in order to characterize the backoff time performance across multiple WLAN devices. Bianchi et al. performed experiments and an in-depth comparative analysis of multiple network cards and clearly showed the performance differences thereof. However, the document does not provide a framework which would allow developing test scenarios which could efficiently be applied for fully and reliably characterizing and comparing a plurality of WLAN cards in terms of their network performance.

It is one object to develop a technique which could routinely and efficiently be applied for testing WLAN devices and which enables fully and reliably characterizing and comparing a plurality of WLAN devices in terms of their network performance.

SUMMARY OF THE INVENTION

According to one aspect of the invention, a method of testing an IEEE 802.11 or WLAN device under test (DUT) in a test system is proposed. The method comprises initiating exchange of an ICMP message pair between the DUT and the test system; and determining a backoff time selected by the DUT during the message exchange.

The DUT may comprise any WLAN device such as a chip, chip set, or generally any WLAN-enabled semiconductor device, which may be supported or embedded on or within a circuit board (PCB, printed circuit board), conductor board, plate, or card, such as a network (interface) card for permanent integration or a removable WLAN stick for temporary connection to a computing device, etc. The DUT may operate according to any one or more of existing or future protocols in the wireless environment and in particular in the IEEE 802.11 field. The DUT may additionally support other data communications technologies such as may be adapted for mobile communications according to UMTS or LTE, wireline communications according to LAN technologies such as Ethernet, etc.

The Internet Control Message Protocol (ICMP) is one of the protocols of the Internet Protocol (IP) suite. ICMP messages are typically used for diagnostic or control purposes or generated in response to errors in IP operations, i.e. ICMP is not normally used to exchange data between systems and differs in that respect from transport protocols such as TCP or UDP. The terms (ICMP) 'message' from the perspective of the transport layer, 'packet' from the perspective of the network or IP layer, 'frame' from the perspective of the MAC layer, and even 'burst' from the perspective of the physical layer may occasionally be used interchangeably herein, as in many implementations a single ICMP message will be encapsulated in a single IP packet, which will be encapsulated in a single layer-2 frame, which will be transmitted in a single burst.

Various network utilities or diagnostic tools are based on ICMP messages, such as 'ping' or 'traceroute'. The ping utility is implemented using the ICMP "Echo request" and "Echo reply" messages. The traceroute command is implemented by transmitting IP datagrams with a specifically set IP TTL header field, and looking for ICMP Time To Live exceeded in transit and "Destination Unreachable" messages generated in response.

Single ICMP messages may be sent by the test system to the DUT, and backoff time of a response message sent from the DUT may be determined at the test system, which may include measuring a response time and calculating the backoff time from the measured response time.

A message exchange may be repeated a plurality of times as desired to achieve, for example, a statistically reliable measurement of the random backoff behavior of the DUT. Exchanging a plurality of ICMP message pairs is to be understood in contrast to either one of the test system or the DUT sending a stream of data packets, e.g. a stream of UDP packets, via the WLAN channel and performing any measurements on the basis of that stream or a response behavior to that stream.

Performance measurements can be more flexibly performed on the basis of ICMP message pairs. For example, configuring a network card under test to emit a stream of UDP packets requires providing an appropriate amount of data with an appropriate data rate to the card, while a network utility such as ping can be expected to be a built-in feature of the card which can be triggered without requiring any further complex configuration of the DUT or other or further (external) components. Similarly, a utility such as ping may be simply be triggered as long as required to achieve the desired amount of measurement data, and can then be stopped.

When measuring a plurality of cards, triggering a built-in ICMP utility may allow focusing the analysis on the wireless capabilities of the DUT, while when measuring the wireless transmission of external data, the results may be influenced by, for example, the capabilities of the data input socket or queue of the device, any internal forwarding mechanism, and the processing of the data along the protocol stack for wireless transmission, etc., which may lead to the measurements being influenced by effects not directly related to the wireless transmission capabilities of the DUT. A comprehensive analysis should discriminate between these various effects and may therefore present both, specific results on the wireless capabilities as well as further results related to the general forwarding performance of external data. Embodiments of the invention allow performing such comprehensive analysis.

WLAN data transmissions from the perspective of the MAC layer or data link layer may comprise that a frame is acknowledged by an acknowledgement frame ('ACK' for short). According to various embodiments, the backoff time may be determined from a measured time span between an ACK received from the DUT and an ICMP message received from the DUT. For example, the test system may send an ICMP message such as an Echo Request to the DUT, which will respond with an ACK in the MAC layer (in case of successful transmission), and will further subsequently send an Echo Reply as required from the transport layer communication. Measuring the delay between ACK and ICMP response of the DUT can be advantageous over other measurement approaches, as in case of the ACK as well as in case of the incoming ICMP response an incoming signal is measured by the test system, i.e. the measurement of an incoming signal is presumably performed the same way each time, which may result in a well defined basis for time measurements and may contribute to accuracy of the measurements. As an example, the test system may be adapted to define a time point of reception of an incoming burst according to a rising edge of the incoming burst. In contrast, measuring a time span between, for example, an ACK sent by the test system and an incoming burst from the DUT may be a priori less precise, e.g. if the transmitted burst is measured at its falling edge, and a comparable accuracy may at least require additional processing.

According to various preferred embodiments, a carrier transmission may be performed on the WLAN channel for delaying the DUT transmitting its ICMP message. The occupied channel will be detected by the DUT, which will therefore defer its own transmission. In this way, the DUT can efficiently be triggered to delay its transmission, which is a measure which can intentionally be taken to, for example, ensure that any measured response times are free of DUT internal effects such as delays due to message preparation in the protocol stack, e.g. IP and MAC layer delay, queuing effects for example in case of internal data congestion, etc. As discussed above, internal effects can and should be assessed in a comprehensive analysis, however, triggering the DUT to delay its response is an important and effective measure which enables discriminating between backoff behavior and other effects.

Accordingly, the carrier transmission may be configured to achieve that a data frame such as an ICMP response is ready for transmission in the DUT. The carrier transmission may itself comprise one or more ICMP packets, for example one or more ping packets, which can contribute to a simple yet effective test environment to be seen in contrast to, for example, preparation of specific MAC frames comprising a correct MAC header and empty body, or a specifically corrupted frame, which requires complex modifications to the protocol stack.

The carrier transmission can effectively be triggered by a reception of an ACK from the DUT. On reception of the ACK, a corresponding trigger signal may be provided internally in the receiving test device, or the trigger signal may be provided accordingly to an external, second test device.

The carrier transmission frames, packets, and/or messages may be prepared according to a conventional protocol stack, but may carry a fake destination address, which as such is a measure easy to achieve and known to the skilled practitioner. Additionally or alternatively, with an appropriate configuration of a header of the channel transmission it can efficiently be achieved that the DUT preempts its transmission and waits for idle channel without changing its internal state to a carrier sensing modus.

According to various preferred embodiments, the DUT is triggered to perform a retransmission. A comprehensive analysis of a WLAN device may cover an analysis of the retransmission behavior, including the backoff behavior in retransmission (exponential) cases. According to some of these embodiments, the retransmitted message may comprise a single ICMP message. Measuring retransmission in such a case may be advantageous over measuring retransmissions of data packets such as, for example, UDP, TCP or RTP packets, as if a specific single retransmitted IMCP message is measured, the measured retransmission behavior may be less prone to effects not directly connected to the wireless transmission capabilities of the DUT.

Within a test scenario based upon exchanging single ICMP message pairs between test system and DUT, a retransmission can be triggered particularly efficiently by suppressing an ACK to be sent to the DUT. The suppressed ACK may comprise the acknowledgement of an ICMP response message sent by the DUT in response to an initial ICMP trigger sent by the test system. Deferring an ACK can, for example, be achieved with a minor modification of a MAC protocol implementation, to be seen on contrast to complex modifications required when to suppress one or more ACKs for a permanent stream of UDP packets received from the DUT.

According to various preferred embodiments, a second, third, fourth, etc. retransmission can be triggered, which can be achieved by responding with an ACK only to the third, fourth, fifth, etc. successful reception of the retransmitted same message or packet sent by the DUT. The required response behavior can easily be implemented, for example, in a MAC protocol of the test system. An example of a currently preferred implementation comprises triggering a higher order retransmission by inspecting the retry bit of the Frame Control Field of the frame carrying the ICMP message of the DUT. An ACK is sent only in response to the retry bit being set to a required value as configured in the MAC protocol implementation of the test system according to the currently performed test case.

According to various preferred embodiments, a plurality of message exchanges may be performed including initial transmissions and retransmissions. A test run may accordingly comprise a number of test cases for measuring backoff behavior of initial transmissions, and may further comprise a number of test cases for measuring backoff behavior of retransmissions. For example, the retransmission test cases may intend to measure backoff behavior for a first retransmission, second retransmission, . . . and/or a highest order retransmission. In this way, an analysis can be targeted by simple configuration in the test system to comprehensively determine coverage of the various contention window sizes for initial and exponential transmissions by the DUT.

Based on such test run, the DUT can then be classified according to at least one classification criterion related to exploitation or coverage of contention window size in the initial transmissions and/or the retransmissions. The classification can for example be based on retransmissions for different contention window sizes. One or more classification criteria can be defined wherein, for example, each criterion may relate to one of the initial/exponential contention window sizes.

Additionally or alternatively, a plurality of message exchanges with and/or without triggering a delay in the DUT can be performed. The DUT can then be classified according to at least one classification criterion related to exploitation of contention window size in the delayed and/or non-delayed transmissions. The classification may also reflect whether and to what extent a performance of a given DUT may suffer from internal delays, i.e. whether the DUT may suffer from hardware problems, protocol implementation problems, etc.

Additionally or alternatively, a plurality of message exchanges with different levels of Quality of Service (QoS) may be performed, for example by using a QoS mechanism such as the AIFS (Arbitration Inter-Frame Spacing) mechanism. The DUT may then be classified according to at least one classification criterion related to exploitation of contention window sizes in the different QoS levels.

According to specific preferred embodiments, test cases combining one or more of the various test aspects of the DUT responding with and without delay, measuring initial and exponential transmissions, and transmitting in different QoS classes can be performed for achieving a comprehensive analysis. Advantageously, as the various mechanisms such as delaying a response, triggering retransmissions, and QoS can be controlled independently of each other, combination tests can efficiently be implemented.

A classification criterion may comprise a predefined threshold number representing a number of backoff time slot. For example, the classification criterion may indicate, in terms of backoff slots, a mean value (integer/real number) of a plurality of initial transmission backoff times. Additionally or alternatively, one or more other statistical measures can be referred to, such as a median, a variance, a smoothness of a measurement results distribution, etc. The criterion may include a threshold, which may represent an acceptable deviation (e.g. seen as insignificant) from an expected, e.g. standard conformant, statistical value such as a mean value.

The abovementioned need is further satisfied by a computer program product, which comprises program code portions for performing the steps of one or more of the methods and method aspects described herein when the computer program product is executed on one or more computing devices, for example of a test system. The computer program product may be stored on a computer readable recording medium, such as a permanent or re-writeable memory within or associated with a computing device or a removable CD-ROM, DVD or USB-stick. Additionally or alternatively, the computer program product may be provided for download to a computing device, for example via a data network such as the Internet and/or a LAN or a communication line such as a telephone line or wireless link.

According to another aspect of the invention, a test system, especially for testing an IEEE 802.11 DUT, comprises a component adapted to initiate exchange of an ICMP message pair between the DUT and the test system and a component adapted to determine a backoff time selected by the DUT during the message exchange. The test system may comprise, for example, a WLAN access point emulator, and optionally a further station emulator for populating the channel for triggering the DUT to delay its transmission.

The test system may be implemented as a software and/or functional instance on a general-purpose hardware such as a PC and/or a dedicated computing hardware including wireless transmission capabilities. According to exemplary embodiments, the test system may be implemented on a special purpose hardware, firmware, and/or software combination such as a specifically adapted test & measurement device for the wireless field. Any computing hardware may comprise a programmable microprocessor, a Field Programmable Gate Array (FPGA), an application specific integrated circuit (ASIC), a digital signal processor (DSP), one or more of these, combinations thereof, etc.

Bianchi et al. describes complex experimental assessments of WLAN network card backoff performance. However, amongst others the analysis is based only specifically on IEEE 802.11b cards based on Direct-Sequence Spread Spectrum (DSSS) and comparatively long interframe spaces and limited throughput (11 Megabits per second, Mbps). More up-to-date WLAN chipsets are based on Orthogonal Frequency Division Multiplexing (OFDM), use shorter interframe spaces, and have a maximum throughput of 54 Mbps for IEEE 802.11a/g, and 65 Mbps for IEEE 802.11n-SISO. Further, Bianchi et al. restrict their experimental setup to initial backoff procedures. No approaches for test strategies are discussed with regard to exponential transmissions and/or data transmissions with QoS.

Various preferred embodiments of the invention provide a technical framework for testing one or more WLAN devices. The framework allows that test scenarios can flexibly be prepared and applied to test one or more of a variety of aspects related to backoff performance. The test cases or test runs enable fully and reliably characterizing the backoff behavior of one or more devices. At the same time, the test cases can be implemented efficiently as requiring only on-board measures or minor modifications of a conventional protocol stack. Based on properly designed test runs, categorizations can automatically be performed and clear-cut information about tested devices be provided which can be of relevance for WLAN users and, for example, may allow users comparison of devices with regard to intended employment.

For instance, ICMP message exchanges have been contemplated as providing a more flexible and easy to adapt basis for testing backoff performance in comparison to loading a DUT with, e.g. UDP traffic, which turns out in detail to be more complex with regard to proper traffic generation and analysis. Various examples highlighting the power and flexibility of embodiments of the inventive framework and approach will be discussed below.

BRIEF DESCRIPTION OF THE DRAWINGS

In the following, the invention will further be described with reference to exemplary embodiments illustrated in the figures of the drawing by way of example only. In the drawing FIG. 1 schematically illustrates an exemplary test environment for implementing embodiments of the invention.

DETAILED DESCRIPTION OF PREFERRED EMBODIMENTS

Figure 1:
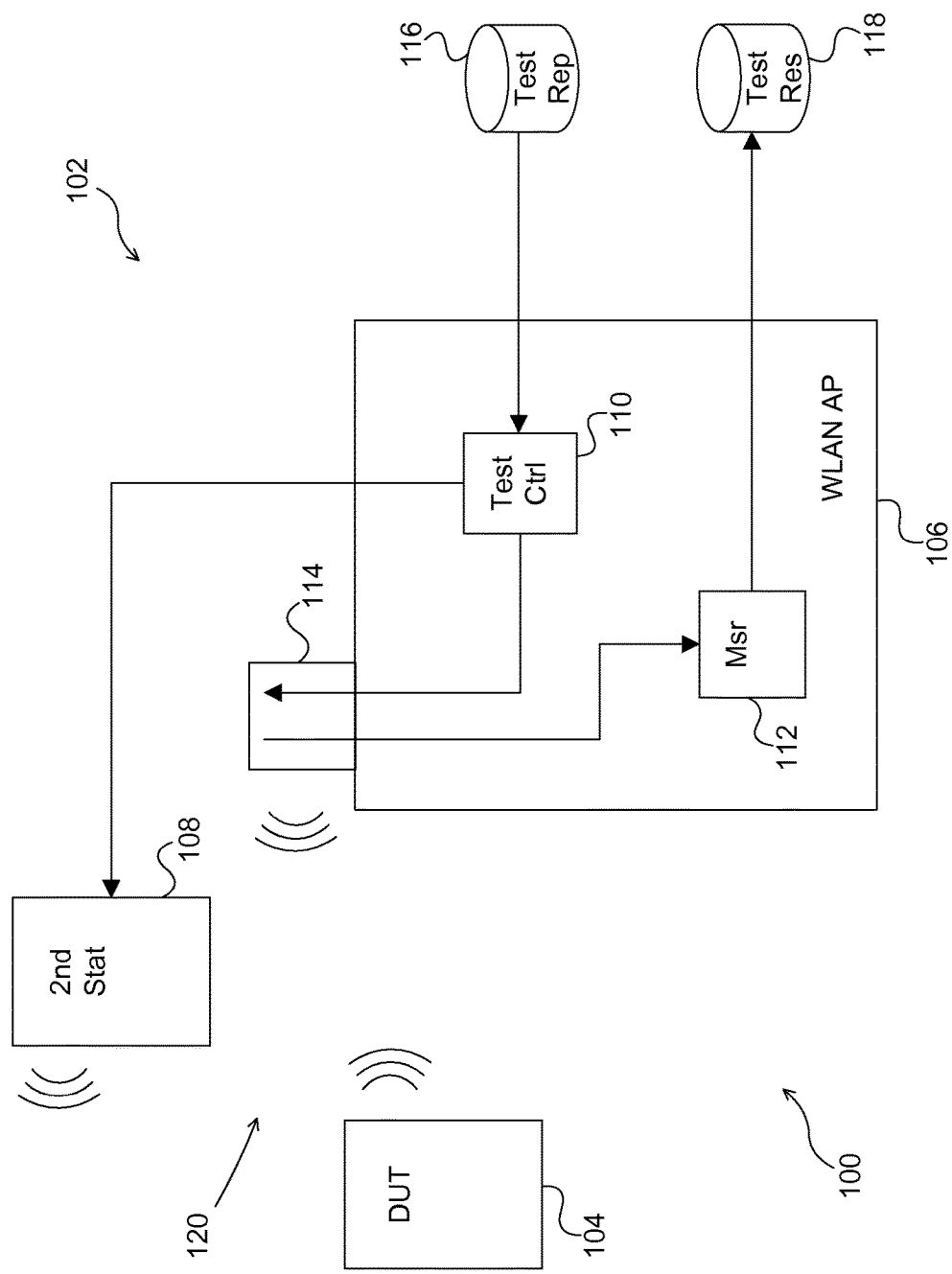

FIG. 1 schematically illustrates an embodiment of a test environment 100 including a test system 102 for testing a performance of an IEEE 802.11 WLAN station or device under test (DUT) 104. The test system 102 comprises a WLAN access point (AP) emulator 106 and a $2^{nd}$ station emulator 108.

The DUT 104 may be any WLAN-capable device such as a WLAN enabled chip, chipset, stick, network card, etc., but also complex device such as a tablet or other general-purpose computer with integrated WLAN facility, mobile phone, smartphone, field device for industrial purpose, etc. When performing tests for comparing various devices, the identical tests may be repeated sequentially, or various devices may be tested (quasi)parallel. However, for sake of conciseness test environment 100 is described and referred to herein below as testing only a single DUT 104 at a time.

The AP emulator 106 comprises as functional components a test control component 110 and a measurement and performance determination component 112. Both components may for example be implemented as a functional and/or software instance. A transceiving (transmission and reception) component 114 is provided which comprises amongst others antenna equipment for performing WLAN transmissions and receptions.

According to a specific example, the AP emulator 106 may be embodied as a test & measurement device, while the $2^{nd}$ station emulator 108 may be embodied as a signal generator or source measurement unit (SMU) known as such to the skilled practitioner. While AP emulator 106 and $2^{nd}$ station 108 are illustrated as separate components in FIG. 1, according to other embodiments both functions may be provided as an integrated component using, e.g., one and the same transceiving equipment 114.

Figure 2:
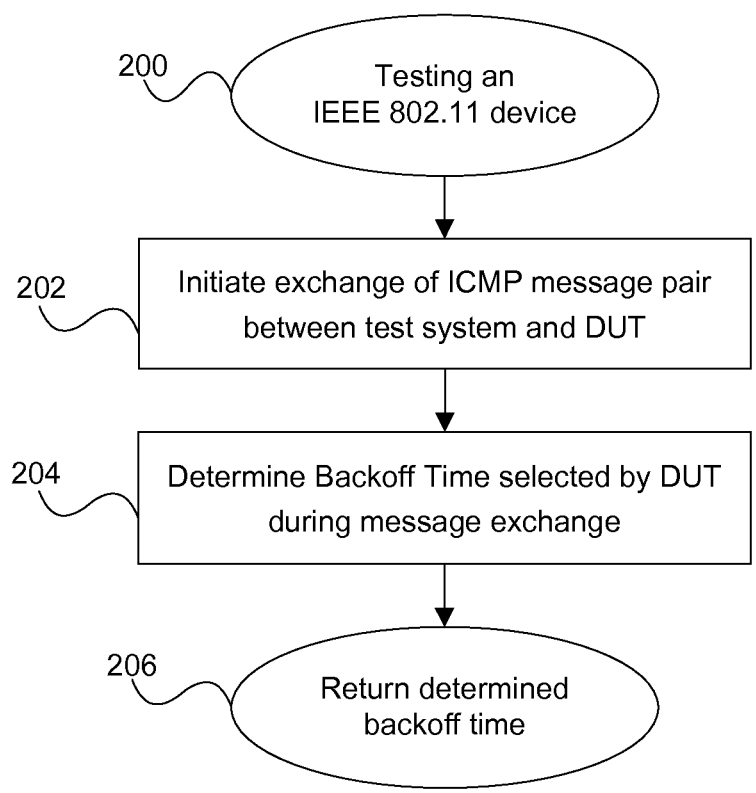
FIG. 2 is a flow diagram illustrating an operation of an embodiment of a test system in the environment of FIG. 1.

An operation 200 of the test system 102 for testing DUT 104 is described with reference to the flow diagram in FIG. 2.

In step 202, exchange of an ICMP message pair between the DUT 104 and the test system 102 is initiated by test control component 110. Specifically, control component 110 may retrieve and execute a test case such as may be stored in a test case repository 114. The test case may comprise a sequence of one or more messages, packets or frames to be sent to the DUT 104 and/or expected to be received from the DUT 104. Specific examples of test cases will be described in the following. For performing a test run comprising a plurality of test cases, batch files and/or macro files may be provided in repository 116 as understood by the skilled practitioner.

In step 204, the measurement component 112 determines a backoff time selected by the DUT 104 during one or more of the message exchanges performed during step 202. Specifically, the measurement component 112 may receive from transceiving component 114 analogue and/or digital representations of the signals as sent to and received from the DUT 104. Depending on the details, the signal representations may be provided by a layer-1 component encapsulating physical layer functionality, or the required measurements may be performed by said layer-1 component. For example, the transceiving equipment 114 may comprise layer-1 functionality. Additionally or alternatively, the measurement component 112 may analyze signal representations, wherein details of the measurements as may be performed are discussed in more detail below.

The component 112 may also operate to extract a backoff time from the measured data and may in this respect perform calculations based on further data related to IEEE 801.11 standards, said data, e.g. representing the length of interframe spaces (IFS). For example, data may represent the length of a DIFS (DCF Interframe Space), SIFS (Short Interframe Space), and/or PIFS (Point Coordination Function Interframe Space) as defined according to a particular IEEE 802.11 standard with reference to which DUT 104 is tested.

In step 206, component 112 provides a representation of the determined backoff time in a storage component 118 for further analysis, presentation of the results to a user, etc. Any post-processing on the determined backoff times may also be performed by the component 112, and/or may be performed by other components of the test system 102, and/or may be performed remote of testbed 102.

Figure 3:
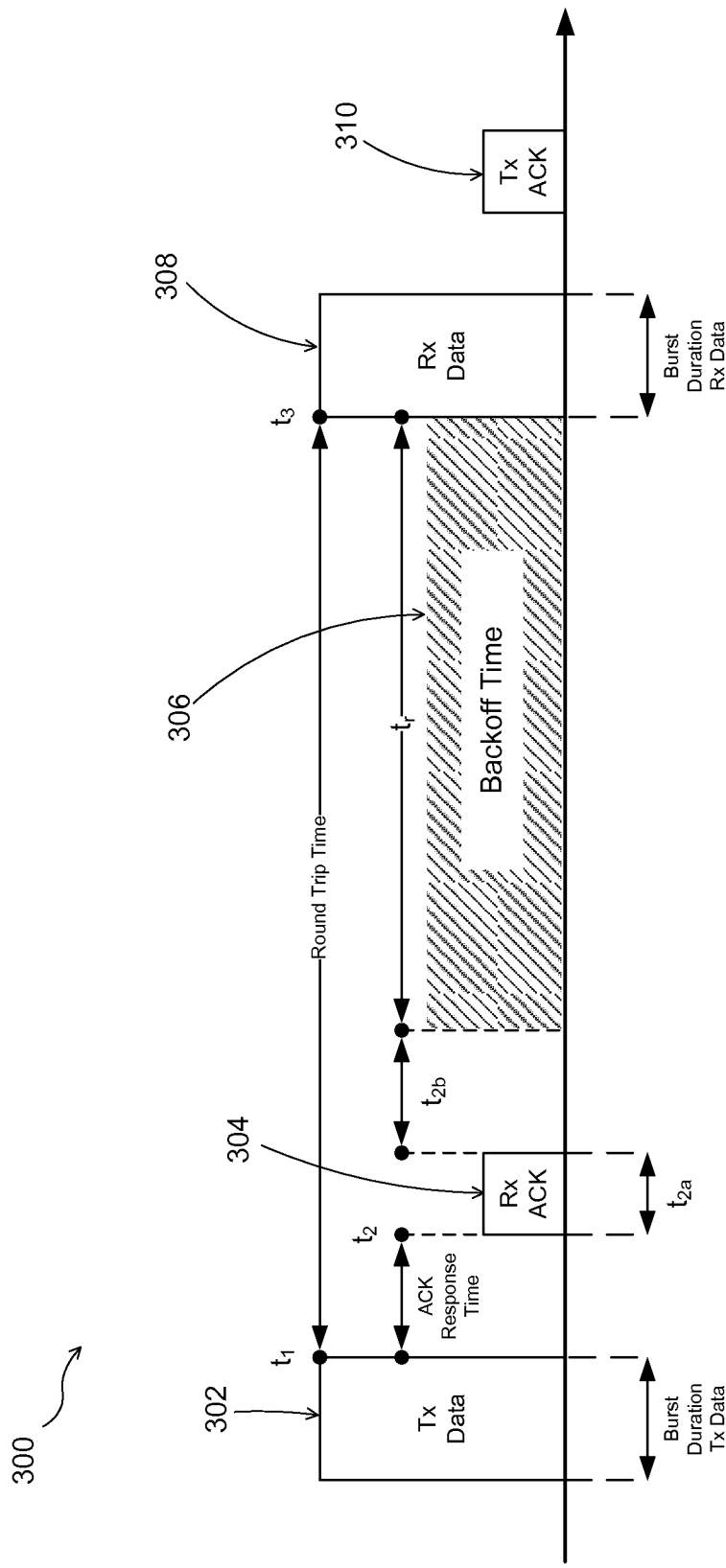
FIG. 3 illustrates as a frame sequence a message exchange between test system and DUT according to a first example of a test scenario.

FIG. 3 illustrates as a frame sequence in time domain a message exchange 300 as may be performed between test system 102 and DUT 104 of FIG. 1 according to a test case stored in repository 116 and execution be triggered by control component 110. Generally, any signals or bursts (frames, packets, messages) transmitted by AP emulator 106 are designated "Tx" (downlink) in the figures, while signals or bursts (frames, packets, messages) received from the DUT 104 are designated "Rx" (uplink).

The test case or test sequence as depicted in FIG. 3 starts with transmitting frame 302 to DUT 104. Successful reception of frame 302 is acknowledged by ACK frame 304 as received from DUT 104. After a time span including a backoff time $t_r$ (306) as selected randomly by DUT 104, the DUT 104 responds to message encapsulated in frame 302 by transmitting message encapsulated in a frame 308, which is in turn acknowledged by AP emulator 106 sending ACK 310.

Regarding higher layer content, frames 302 and 308 may comprise each IP packets in turn encapsulating an ICMP message. As a specific example, frame 302 may transport an Echo Request message (Ping) to DUT 104, and frame 308 may transport a corresponding Echo Reply message of DUT 104. The Ping utility is normally available in in any IP protocol suite, and can therefore be expected at the DUT 104 also. Using such built-in tool for the purpose of measuring WLAN backoff times can be advantageous over provision of, for example, external data streaming based on UDP, TCP, RTP packets, which requires proper configuration and control of external data sources as well as the DUT and the AP emulator.

Referring in detail to the time delay between ACK frame 304 and response frame 308, when attempting to access WLAN channel 120 (see FIG. 1), the DUT 104 may operate according to a CSMA/CA mechanism as prescribed by an IEEE 802.11 standard, which includes waiting for a DIFS as indicated by time span $t_{2b}$ in FIG. 3, and adding thereto the backoff time $t_r$ as a random multiple of a predefined time slot of normally several microseconds (μs) duration, wherein the random number is between zero and a maximum predefined number, which may set to, e.g., 7 for an initial transmission, 15 for a first retransmission, 31 for a second retransmission, etc.

The backoff time $t_r$ (306) of DUT 104 in the sequence of FIG. 3 can be measured as follows. The measurement component 112 (or any other signal analysis component of AP emulator 106) may record and analyze burst information regarding transmitted and received bursts and may measure the transmitted and received burst time. For example, a transmit (Tx) burst time point may be measured at falling edge of the corresponding burst, which is illustrated with time point $t_1$ in FIG. 3 at transmitted burst 302. Received (Rx) burst time points may be measured at rising edge of the received burst, which is illustrated with time $t_2$ in FIG. 3 at received burst 304 and with time $t_3$ of received burst 308.

The random backoff time $t_r$ can be determined by:

$$t_r = t_3 - (t_2 + t_{2a} + t_{2b}).$$

The values of $t_2$, $t_{2a}$, and $t_3$ are measured or known and therefore available to determination component 112. The value of $t_{2b}$ (DIFS) is fixed depending on the specific standard used, and is, e.g., 16 μs for IEEE 802.11a/g/n, or 10 μs for IEEE 802.11b.

Figure 4:
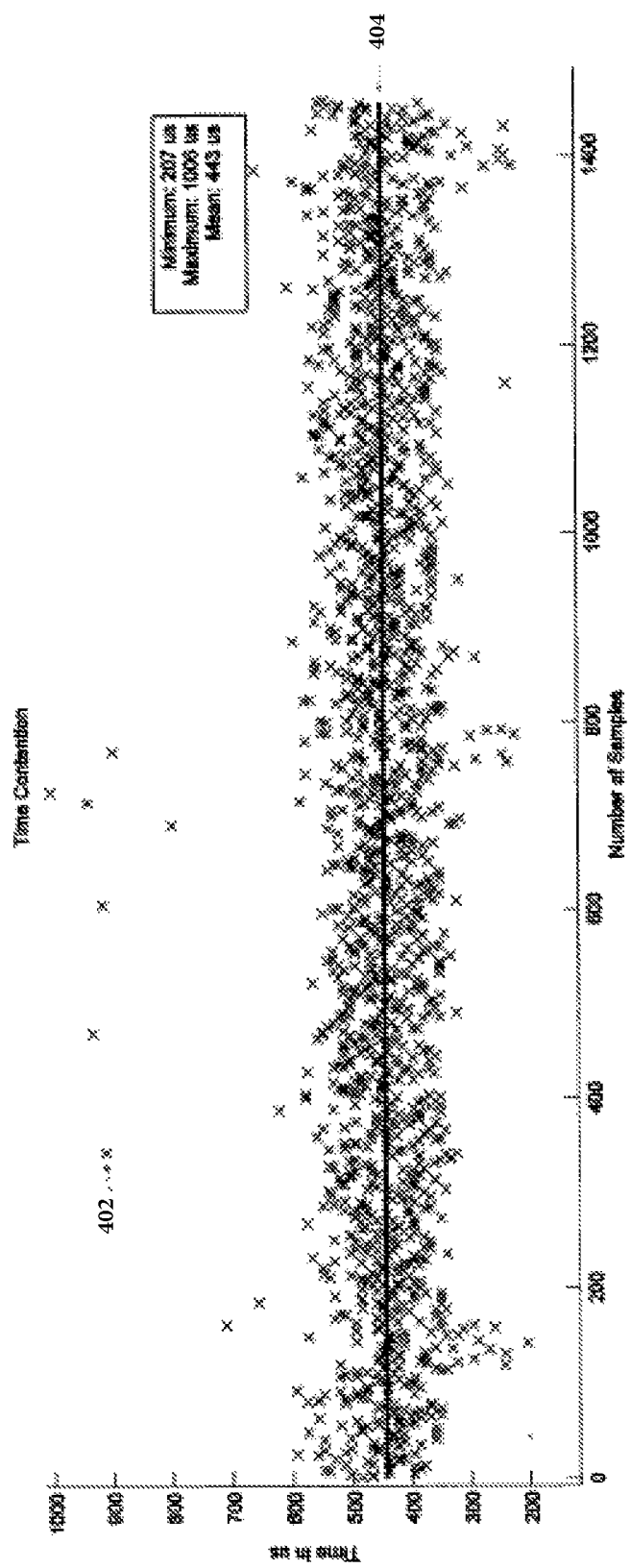
FIG. 4 exemplarily illustrates backoff time measurement results for the test scenario of FIG. 3.

FIG. 4 exemplarily illustrates backoff time $t_r$ measurement results which may have been attained in test environment 100 of FIG. 1 when executing in a test run the test sequence of FIG. 3 a plurality of times. Specifically, the Ping utility was employed about 1500 times to a particular DUT, namely a commercially available chipset in a 5 GHz WLAN channel and in IEEE 802.11n mode. The Echo Reply from the DUT has been measured and backoff times have been calculated for each single case in a way as has been described above for the sequence of FIG. 3.

The resulting backoff time values are plotted in FIG. 4 over sample number. Each measurement result is indicated with a cross 402. The maximum measured backoff time is 1008 μs, the minimum measured time is 207 μs, and a mean backoff time results to 445 μs as is indicated by the straight horizontal line 404 in FIG. 4.

When plotting measured backoff times over sample number, one would expect an about even or smooth distribution of the backoff times between a sharp minimum value and a sharp maximum value as the backoff times are supposed to be selected with equal probability within the contention window limited by the minimum possible backoff time of zero and a maximum backoff time as applicable for the contention window of, e.g. an initial transmission and a particular IEEE 802.11 standard. However, the data set of FIG. 4 does not show a well defined upper and/or lower limit.

The blurred distribution of FIG. 4 may be taken as a hint towards the tested chipset having hardware or other implementation problems, which can also be interpreted as a test result as such. The distribution of FIG. 4 could be analyzed further in this respect, which is however in detail not at the focus of the present discussion. Below a further test scenario is presented which enables, on the one hand, measuring backoff times as selected by a DUT more cleanly, and which may serve, on the other hand, analyzing the behavior of unexpectedly delayed response frames further.

Figure 5:
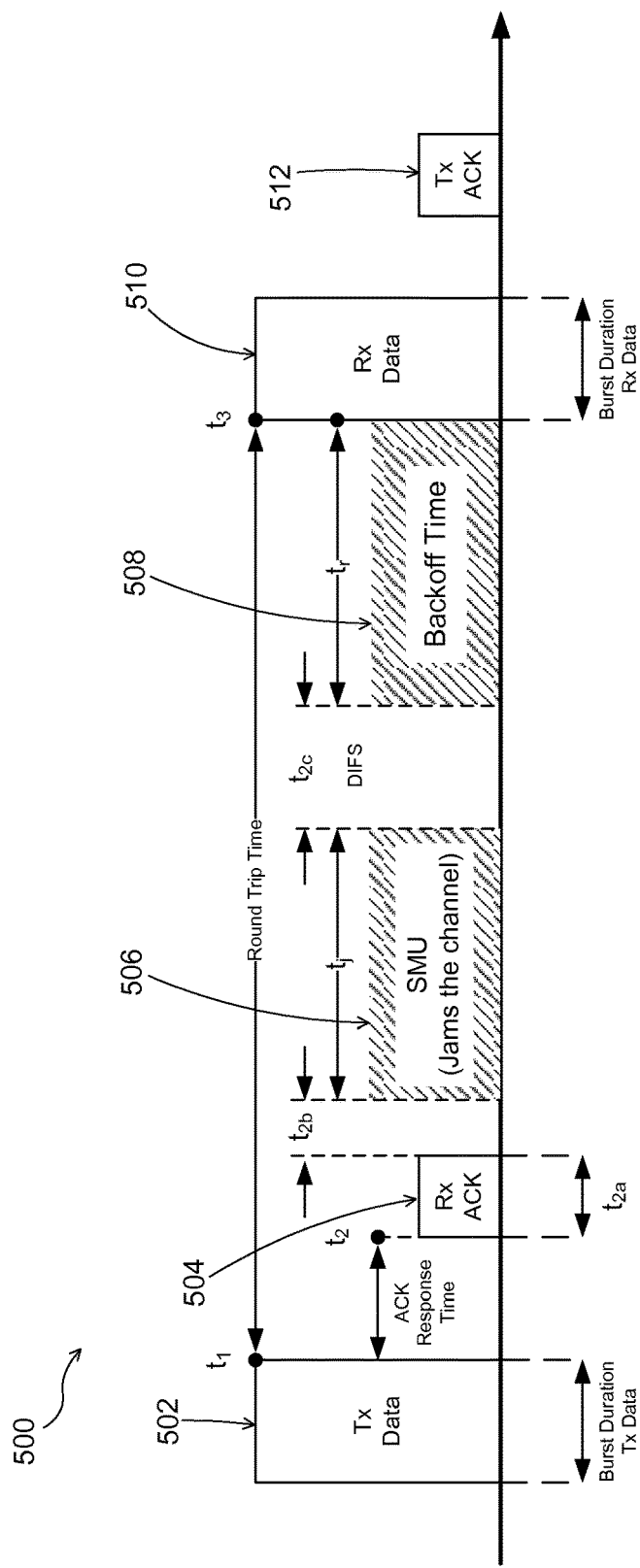
FIG. 5 illustrates as a frame sequence a message exchange between test system and DUT according to a second example of a test scenario.

FIG. 5 illustrates a further frame sequence in a similar way as has been introduced with FIG. 3. A message exchange 500 may be performed between test system 102 and DUT 104 of FIG. 1.

Specifically, the test case starts again with transmitting a frame 502 to DUT 104. Successful reception of frame 502 is acknowledged by ACK frame 504 from DUT 104 ($t_{2a}$=ACK 504 burst duration). Triggered by reception of ACK 504 ($t_{2b}$=$2^{nd}$ station 108 trigger delay), $2^{nd}$ station 108 (see FIG. 1) performs carrier transmission 506, i.e. transmits signal 506 on WLAN channel 120 for a time $t_j$. DUT 104 waits for the channel 120 being idle again, adds a DIFS ($t_{2c}$) and a random backoff time $t_r$ 508 before responding to frame 502 with sending frame 510, which is then finally acknowledged by AP emulator 106 with ACK 512.

With reference to the sequences in FIGS. 3 and 5, one or more reasons for a frazzled jitter such as seen in FIG. 4 can be that a specific DUT may have spurious problems preparing and providing the response to frame 302/502 in time, i.e. sending frame 308 in any case immediately after expiry of DIFS and backoff time $t_r$. For example, a DUT may suffer from Layer 3 (IP) and/or Layer 2 (MAC) stack delays when preparing the response message and/or from queuing problems when providing the message for transmission.

In order to analyze further a distribution such as shown in FIG. 4 and/or measure cleanly the backoff time and backoff time distribution, according to sequence 500 of FIG. 5 it is proposed to trigger the DUT 104 to further delay the transmission of frame 308 by providing a carrier transmission 506. The DUT 104 will detect the transmission 506 and will preempt any transmission until the channel is free, i.e. the transmission 510 is deferred.

Carrier transmission 506 may be selected long enough in time such that it compensates a potential internal delay of a specific DUT and ensures that the data frame 510 is ready for transmission after expiry of $t_r$. The carrier transmission or signal 506 duration $t_j$ may be estimated and/or may be determined by experiments, either for a specific DUT, or for a plurality of devices under test.

In order to measure the backoff time cleanly and accurately, the time $t_j$ should allow a specific DUT to have finished preparation and provision of the intended message (packet, frame) prior to the shortest possible backoff time, namely zero, i.e. $t_j$ may be chosen to ensure availability of the intended message immediately after elapse of DIFS $t_{2c}$ in FIG. 3 or 5. Spurious occurrence of delays in a DUT may require experiments for determining the proper delay $t_j$.

Various embodiments of carrier transmissions can be contemplated for the purpose of the DUT delaying its transmission, i.e. response to the initial frame send from the test system. The carrier transmission is intended to fill or pollute the WLAN channel 120 in a way such that the channel pollution is detected by the DUT. The channel may therefore be 'jammed', i.e. filled with any detectable jam signal.

According to various embodiments, the carrier transmission signal 506 may comprise one or more frames, packets, and/or messages. More specifically, carrier transmission 506 may be embodied as one or more ICMP messages. As a specific example, the carrier transmission may comprise a Ping message, which could be directed, for example, to a fake address.

Generally, it is currently considered preferable that the carrier transmission comprising one or more frames wherein each frame comprises a MAC header allowing the DUT determining a duration of the carrier transmission 506. This allows the DUT 104 waiting for the indicated time (then starting the DIFS timer and waiting further for the selected backoff time as indicated in FIG. 5) without entering a CSMA/CA modus which could prevent proper backoff time measurement.

The backoff time $t_r$ in the scenario of FIG. 5 can be measured as follows: Time point $t_2$ of the rising edge of the ACK 504 received from DUT 104 can be measured. An ACK burst duration $t_{2a}$ may be known or otherwise estimated by measurement component 112. The trigger delay $t_{2b}$ may be known, for example may be selected a PIFS, or may be measured (rising edge) in the AP emulator 106, or may be otherwise determined. The time duration $t_j$ of the channel jam 506 may be known as being predefined. The DUT 104 is then supposed to wait a time span $t_{2c}$, i.e. a DIFS, after the end of the carrier transmission 506 and then to further add the selected backoff time $t_r$. The rising edge $t_3$ of the DUT's response 510 can be measured in AP emulator 106.

Figure 6:
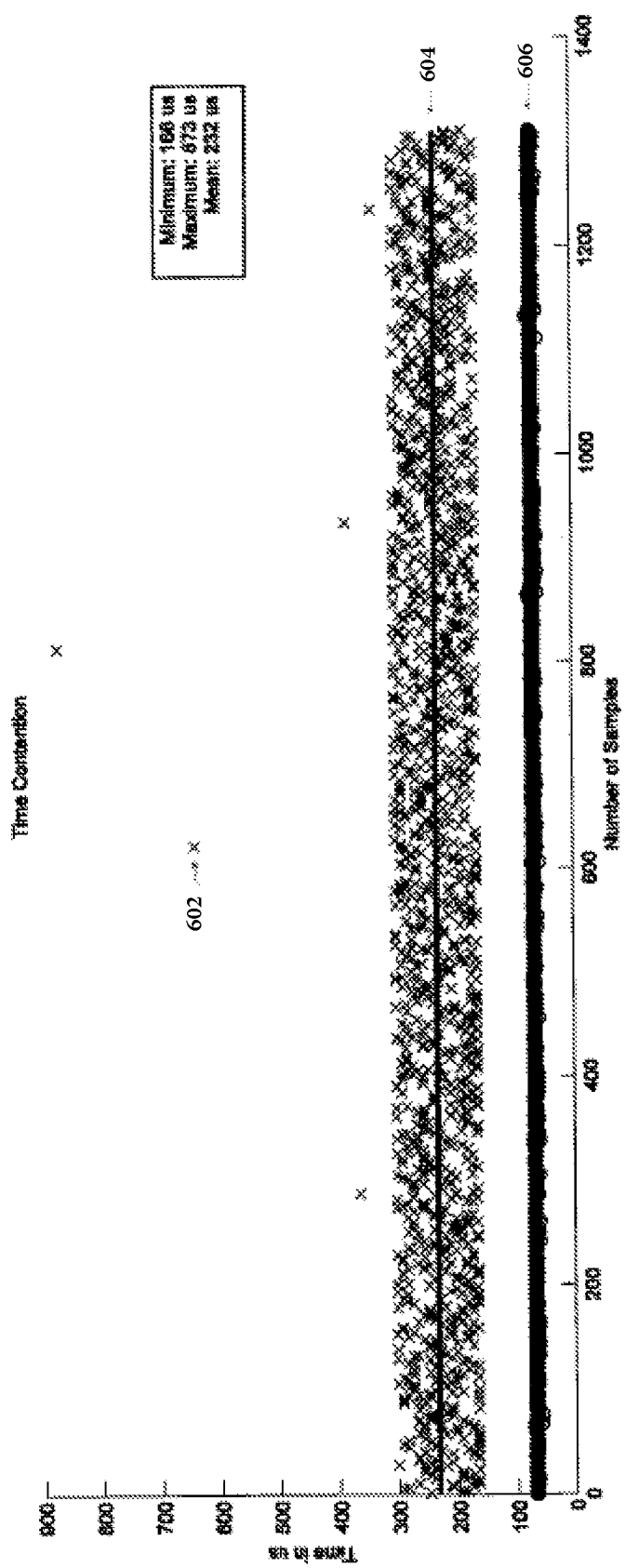
FIG. 6 exemplarily illustrates backoff time measurement results for the test scenario of FIG. 5.

FIG. 6 exemplarily illustrates backoff time measurement results in a way similar to FIG. 4 and which may have been attained in test environment 100 of FIG. 1 when applying the test sequence of FIG. 5 a plurality of times. The Ping utility was employed about 1300 times and the Reply of the DUT measured and analyzed in each case. The measurement results are indicated with crosses 602.

The carrier transmission 506 of FIG. 5 was implemented based on a fake Ping message which was used to jam the channel for about 80 µs after receiving the ACK 504 from the station under test 104. The carrier transmission has also been measured and is indicated in FIG. 6 by the massively overlaying circles 606.

The effect of the carrier transmission 506 is clear from a comparison of FIGS. 4 and 6. According to FIG. 6, there are still few measurement results clearly outside the expected distribution range, which is why the maximum measured backoff time is 873 µs, and the minimum time is 166 µs. However, the jitter or variance around the mean backoff time of 232 µs as indicated by the straight horizontal line 604 in FIG. 6 is equally distributed between a well defined upper and lower limit which apparently correlate with the contention window (initial transmission) as implemented in the DUT.

Figure 7:
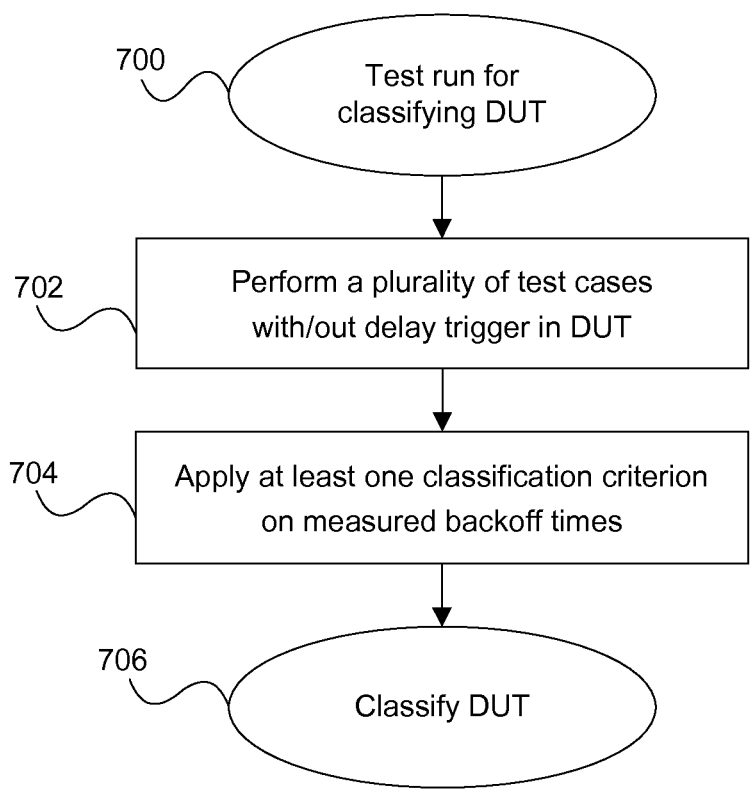
FIG. 7 is a flow diagram illustrating an operation of an embodiment of a test system to perform a test run based on the message exchange of FIG. 5.

FIG. 7 is a flow diagram illustrating a test run 700 which can be applied to classify a given DUT into one of several categories which may be defined related to backoff behavior.

In step 702, at least one test case is performed a plurality of times to allow measuring the random backoff behaviour of the DUT. Specifically, it may be assumed that prior to test run 700 the message exchange 300 of FIG. 3 has been performed a number of times to determine whether the DUT suffers from internal delays, and if so, to determine a proper carrier transmission 506. Then, step 702 may comprise performing the message exchange 500 a plurality of times wherein a measurement result may be as illustrated with FIG. 6.

Should it turn out in the preparation phase that the DUT does not suffer from an internal delay, the step 702 may comprise performing the message exchange 300 of FIG. 3 a plurality of times wherein a measurement result may be as illustrated with FIG. 4. According to still another embodiment, an automatic test run may comprise executing a test case such as that of FIG. 3 a plurality of times, and executing a test case such as that of FIG. 5 a plurality of times, which may also include applying varying carrier transmission signal lengths $t_j$. Should tests be performed with carrier transmissions of varying duration, an at least rough estimate of the internal delay can be determined and/or test results can automatically be generated which are free of spurious internal delay and which cleanly reflect the backoff behavior as implemented in the DUT.

It is however repeated that the backoff time measurement on sequence 300 of FIG. 3 without triggering additional delay may be seen sufficient to characterize backoff performance even in case of internal implementation problems. For example, a spurious delay added in the measurements can be considered small and not essentially influencing the backoff measurements. For example, whether or not the measurements are seen as obscured due to in fact the selected backoff times being not separable from other internal effects may depend on the classification criteria to be applied (see below).

The measurement results may thus represent a distribution such as that depicted in FIG. 4, or FIG. 6, or a combination thereof. The test system 102 may perform a post-processing on the stored 118 measurement results in step 704, which may include applying at least one classification criterion to the results. In the example discussed here, the classification criterion may relate to an exploitation or coverage of the prescribed contention window in the case of the non-delayed test cases 300 and/or in the case of the delayed test cases 500.

One example of a classification criterion may relate to whether the observed backoff times in fact show the mean value to be expected from the contention window as standardized. For instance, in case of an initial transmission with the standardized contention window having a size of 7 times a predefined time slot value, the expected mean value would be 3.5 times the slot value. A classification criterion might include an allowable deviation of an observed mean from an expected or supposed mean.

Criteria may additionally or alternatively relate to further statistical properties of the measured distribution, such as an equal distribution within upper and lower limits, to the width of the distribution, e.g. whether the measured distribution is broader or narrower as to be expected, whether the distribution is shifted in some direction, the distribution showing unexpected gaps, etc. Still other criteria can be contemplated depending, e.g. on the goal of the test.

In step 706, the DUT is classified or categorized according to the results of applying the classification criterion/s in step 704, and the classification result may be output for display, storage, etc. The applied categories may relate to whether the tested device or devices show hints of improper implementation and/or show a backoff behavior as expected.

Figure 8:
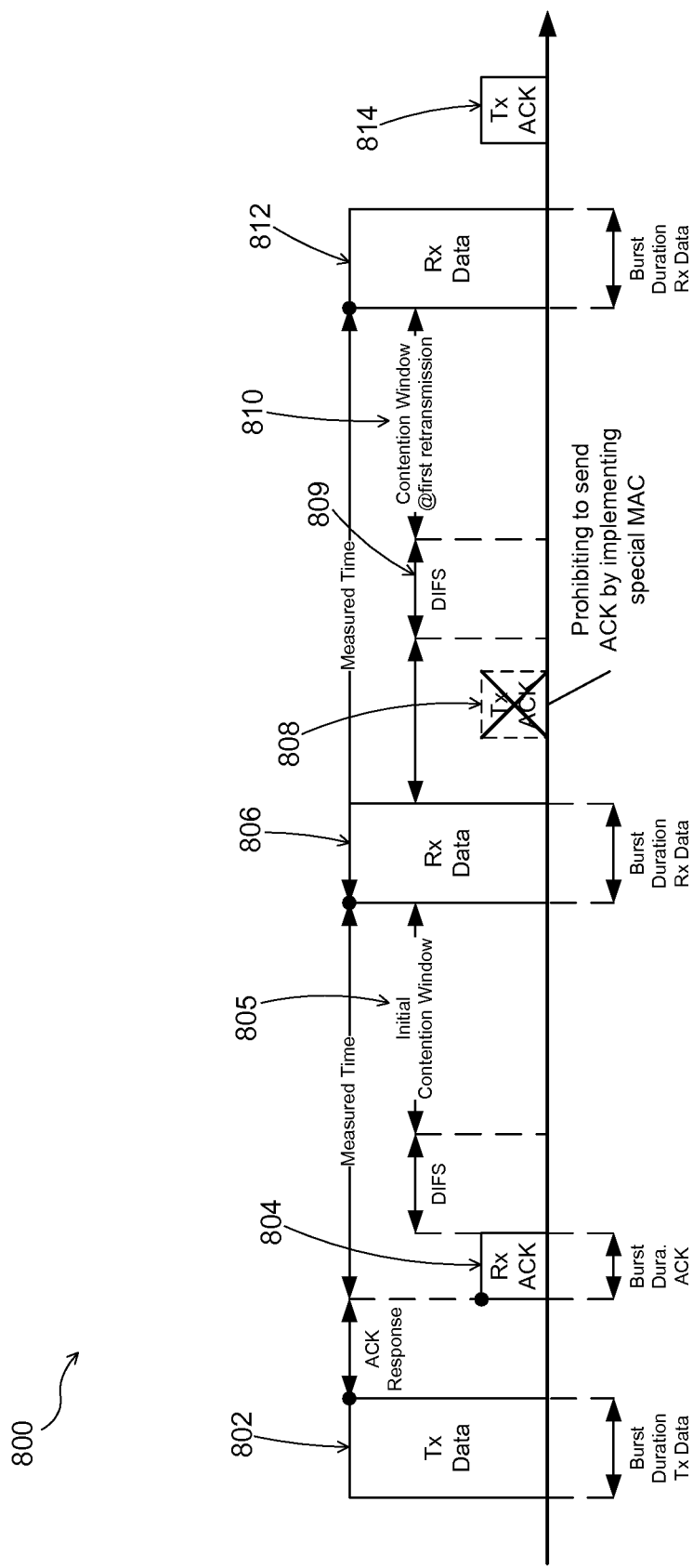
FIG. 8 illustrates as a frame sequence a message exchange between test system and DUT according to a third example of a test scenario.

FIG. 8 illustrates a frame sequence 800 in a similar way as FIGS. 3 and 5. Sequence 800 may form the basis for a further test scenario which is again discussed with reference to the test environment introduced in FIGS. 1 and 2.

The message sequence 800 of FIG. 8 is dedicated to triggering the DUT 104 to perform a retransmission and measure the corresponding backoff time and in this way determine coverage of the expected exponential contention window. Sequence 800 illustrates a particularly advantageous approach for triggering retransmission in the DUT.

Specifically, sequence 800 is started by the AP emulator 106 sending a frame 802 to DUT 104, wherein frame 802 may again encapsulate an ICMP message such as an Echo Request. Successful reception of frame 804 is acknowledged by ACK frame 804 from DUT 104. Further, the DUT 104 waits for a DIFS and a randomly selected initial transmission backoff 805 until transmitting frame 806, which may encapsulate an ICMP message such as an Echo Reply. In case of successful reception of frame 806, the test system 106 would normally send an ACK frame 808. However, according to sequence 800, transmission of ACK frame 808 is intentionally suppressed.

The DUT therefore has to perform a retransmission which includes updating contention window size exponentially and choose a new random backoff time within the updated contention window. Accordingly, as no ACK has been received after a prescribed waiting time, the DUT 104 waits for a DIFS 809, and a further randomly selected backoff time 810 before performing a retransmission, wherein frame 812 may carry the identical message content as frame 806, e.g. the ICMP Echo Reply. In case the backoff time 812 is the test result of interest, the $1^{st}$ retransmission 812 can then be acknowledged with ACK 814.

The backoff time 810 can be calculated from rising edges of received initial transmission 806 and $1^{st}$ retransmission 812, known waiting time of the DUT for the suppressed ACK 808 and DIFS 809 which is known according to the standard applied.

Figure 9:
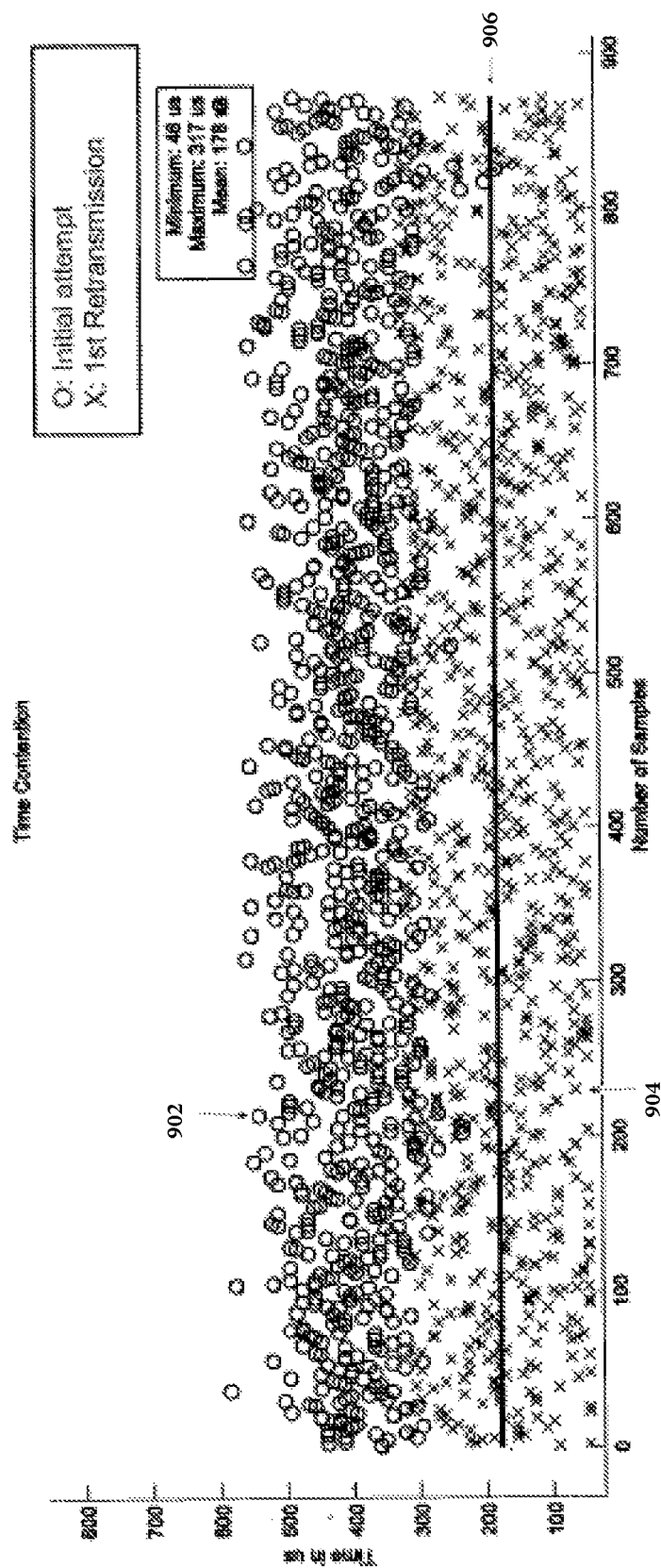
FIG. 9 exemplarily illustrates backoff time measurement results for the test scenario of FIG. 8.

FIG. 9 exemplarily illustrates backoff time measurement results which have been attained by performing a test run including the test sequence of FIG. 8 a plurality of times. Specifically, the Ping utility was employed about 880 times and the $1^{st}$ retransmission Reply of the DUT analyzed.

The measurement results for the initial backoff time 805 are also indicated in FIG. 8 with circles 902, however, these are not further analyzed here. A carrier transmission such as that of FIG. 5 has been skipped in sequence 800 as there were no signs of the $1^{st}$ retransmission 812 being delayed from internal reasons. Crosses 904 indicate backoff times 810 applied by the DUT before performing $1^{st}$ retransmission 812.

The measurements indicate a smooth distribution of backoff times between a well-defined minimum of 46 µs and a similarly sharply defined maximum of 317 µs, confirming absence of spurious internal delays. The mean backoff time as indicated by the straight horizontal line 906 is 178 µs.

Retransmission backoff performance of the DUT can be calculated similar to what has been discussed above for initial transmissions and taking into account the differences in contention window size. For example, the distribution width of the measurement results (e.g., crosses 904) can be compared with the width of the expected retransmission contention window width (e.g., for the $1^{st}$ retransmission). For instance, the measured width in µs divided by the known time step according to the standard applied (e.g., 20 µs) may lead to a guess of whether the DUT indeed fully covers the prescribed contention window, or whether the width in terms of the number of time slot multiples guessed from the measurements, e.g. 7, is smaller than the width in terms of prescribed number of time slot multiples, e.g. 15.

The test performed according to sequence 800 measures the $1^{st}$ retransmission, however, the approach can likewise be applied to higher order retransmissions and requires slight modifications only. For example, according to particular IEEE 802.11 specification a maximum retransmission count may be set to seven, and accordingly the test system may operate to suppress the ACK response until the DUT performs the desired retransmission.

Triggering a retransmission by suppressing an ACK to be sent to the DUT can be implemented particularly efficiently by slight modifying a MAC protocol implementation, which allows avoiding complex interventions on higher layers, e.g. modifying a TCP or RTP stack for triggering retransmissions. Further, suppressing an ACK in a test case comprising few messages only is simple to implement, control and monitor when compared to the approach of, e.g. suppressing a particular ACK in a stream of UDP data sent from the DUT.

Specifically, for implementing the test sequence 800 of FIG. 8, a MAC implementation in, e.g. a socket of transceiving equipment 114 of WLAN AP emulator 106 may be slightly modified. For example, in the frames 806, 812 received from DUT 104 the retry bit in the MAC header FCF (Frame Control Field) and optionally the sequence number can be inspected and can be used to suppress 808 responding with an ACK and only send the ACK 814 until a retry bit is detected equal to a number value specified by the test case.

Figure 10:
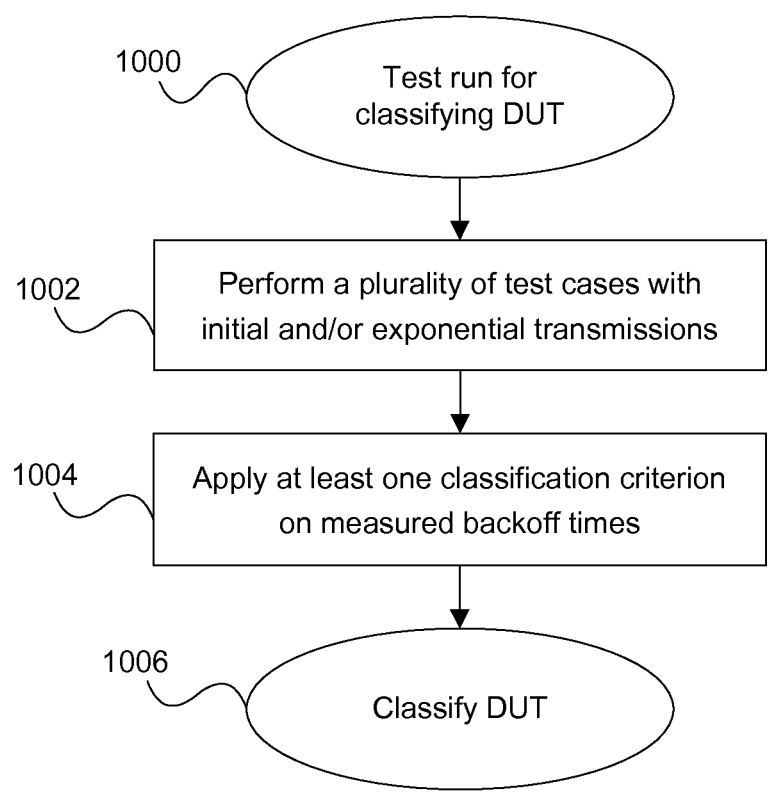
FIG. 10 is a flow diagram illustrating an operation of an embodiment of a test system to perform a test run based on the message exchange of FIG. 8.

FIG. 10 is a flow diagram illustrating an embodiment of a test run 1000 which can be applied to classify a given DUT into one of several categories related to backoff behavior in the retransmission case.

In step 1002, a test run is performed which comprises a plurality of test cases comprising each a single message exchange such as that 800 depicted in FIG. 8. Step 1002 may comprise executing a batch file listing a plurality of single message exchange test cases.

The test run may generally comprise, for example, one or more of the following: a plurality of repetitions of initial transmission test cases each similar to sequence 300 of FIG. 3; a plurality of repetitions of initial transmission test cases similar to sequence 500 of FIG. 5; a plurality of repetitions of retransmission test cases performed according to message sequence 800 of FIG. 8, wherein these test cases may include one or more of $1^{st}$ retransmissions, $2^{nd}$ retransmissions, etc. up to the largest applicable order of retransmission.

The measurement results of step 1002 may be stored in component 118. The test system 102 may perform a post-processing on the stored result in step 1004, which may include applying at least one classification criterion to the results. In the example discussed here, the classification criterion may relate to an exploitation or coverage of the contention window in the case of initial and exponential transmissions.

Exemplary details of how to analyze a measured distribution with regard to a particular contention window size have been discussed above with reference to step 704.

Such analysis may similarly be applied for each of one or more of the different contention window sizes measured in step 1002.

Other or further classification criteria may then relate to a combination of the conformance of the DUT to the prescribed contention window for each of the initial transmission, $1^{st}$ retransmission, $2^{nd}$ retransmission, etc. As a further example, weighting schemes can selectively be applied such that a backoff behavior for initial transmissions is weighted higher than for exponential transmissions to classify the DUT as effective or not for 'low congestion environments', while another weighting scheme may focus more on the (higher order) retransmissions and can be applied to sort one or more tested devices as being effective or not in 'high congestion environments', etc.

In step 1006, the one or more DUTs are categorized according to the results of applying the one or more classification criteria in step 1004, and the automatically achieved association of tested devices to predefined categories is output for presentation, storage, further processing, etc.

As another example of a classification scheme, devices under test may be classified according to their behavior, e.g., compliance (conformance) to a particular IEEE802.11 standard specification regarding initial and/or exponential backoff times, and may be sorted into categories such as 'aggressive' and 'non-aggressive'. For example, a device may be categorized 'aggressive' if selecting random numbers for backoff times smaller than a device categorized as 'non-aggressive'.

Figure 11:
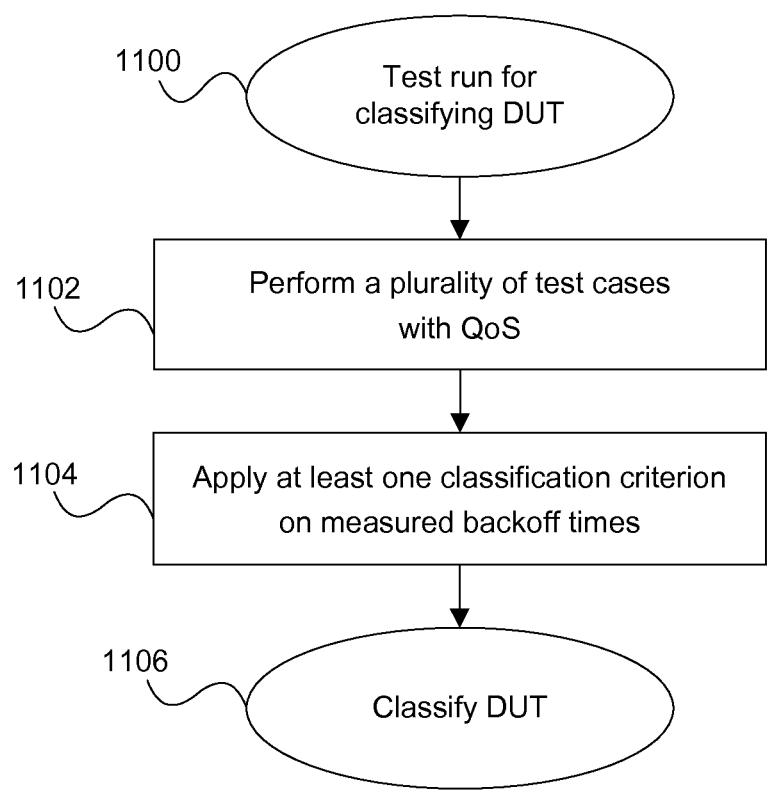
FIG. 11 is a flow diagram illustrating an operation of an embodiment of a test system to perform a test run based on QoS traffic.

FIG. 11 is a flow diagram illustrating a still other embodiment of a test run 1100 which can be applied to classify a given DUT into one of several classifications or categories related to backoff behavior when sending data with QoS.

In step 1102, a test run is performed which comprises a plurality of single message exchange test cases similar to the sequences illustrated in FIG. 3, 5, or 8. However, each test case may specify message exchange in one of multiple levels of Quality of Service (QoS).

One example for a QoS-scheme known as such for wireless LAN communications (IEEE 802.11e) is AIFS (Arbitration Inter-Frame Spacing) which allows discriminating different access categories such as Background, Best Effort, Video, and Voice traffic and to prioritize the traffic according to such categories. The prioritization includes shortening or expanding the contention window size for channel access. For example, a backoff time selected generally shorter due to a shortened contention window means a message has a higher probability of being transmitted with low latency, which may be important for delay-critical data such as voice or streaming video.

Various embodiments of the invention are therefore particularly suited for testing backoff performance in case of QoS traffic. For example, the test run in step 1102 may comprise exchanging MAC frames in various QoS levels. The response behavior of the DUT can then be analyzed regarding whether and to which degree the selected backoff times conform to the contention window size prescribed for the given QoS class.

The measurement results of step 1102 may be stored in component 118. The test system 102 may perform a post-processing in step 1104, which may include applying at least one QoS-related classification criterion to the results. In the example discussed here, the classification criterion may relate to coverage of the expected contention window for the case of at least one particular QoS level. Additionally or alternatively, a criterion related to the general performance of the DUT may be applied with respect to, on the one hand, legacy data sent without QoS, and, on the other hand, data sent with QoS.

In step 1106, the DUT is classified according to the results of applying the classification criterion/s in step 1104, and the classification is output for storage, further processing, presentation, etc.

As an example for a classification scheme, devices may be categorized as to whether being particularly suitable or not for application cases such as transporting prioritized traffic including one or more of video and voice, for example.

While in the preceding examples various classification schemes have been exemplarily discussed, other embodiments can be contemplated which analyze one or more devices under test from a still different perspective. For example, embodiments of classification schemes may consider suitable combinations of the above examples for a comprehensive analysis.

The invention provides a technical framework as the basis for such analysis. While not to be understood as being exclusive, according to one scheme a category may be provided for devices with their backoff times being selected within a longer or standard conformant contention window, leading to comparatively low collision probability and lower throughput, wherein the considered contention window may be that of initial and/or exponential transmissions, with and/or without QoS, etc. Another category may be provided to represent devices which select their backoff times within a shorter than standard contention window, leading to comparatively high collision probability and higher throughput, wherein again the considered contention windows may be that of initial and/or exponential transmissions, with and/or without QoS, etc. As a short, easy to communicate result of such complex analysis, devices may then accordingly be classified as 'aggressive' or 'non-aggressive', and said categories can help WLAN users in selecting a device properly.

It has been illustrated with the above examples that embodiments of the invention provide a technical framework especially suitable for performing fully or partly automated tests of IEEE 802.11 WLAN devices and comparing various of these devices with regard to their backoff performance. Efficient and reliable tests and test runs can be designed which enable a comprehensive analysis of the devices under test. Minimum effort is required to adapt existing test systems for executing tests according to embodiments of the invention.

While the invention has been described in relation to its preferred embodiments, it is to be understood that this description is intended non-limiting and for illustrative purposes only. In particular, various combinations of features wherein the features have been described separately hereinbefore are apparent as advantageous or appropriate to the skilled artisan. Accordingly, it is intended that the invention be limited only by the scope of the claims appended hereto.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A method of testing a device under test (DUT) in a test system, comprising
   initiating exchange of an Internet Control Message Protocol (ICMP) message pair between the DUT and the test system; and
   determining a backoff time selected by the DUT during the message exchange,
   wherein the backoff time is determined by:

$$t_r = t_3 - (t_2 + t_{2a} + t_{2b}),$$

wherein $t_r$ is the backoff time, wherein $t_2$ is a first received burst time point measured at the rising edge of a first received burst comprising an acknowledgement frame ACK receiving from DUT,
   wherein $t_3$ is a second received burst time point measured at the rising edge of a second received burst comprising an ICMP message received from the DUT, wherein the second received burst follows the first received burst,
   wherein $t_{2a}$ is the burst duration of the acknowledgement frame ACK received from the DUT, and
   wherein $t_{2b}$ is a time span which indicates waiting for a distributed coordination function interframe space interval; and
   providing to the DUT a carrier transmission such that it transmits after expiry of the determined $t_r$.

2. The method according to claim 1,
   wherein the backoff time is determined from a measured time span between the acknowledgement frame ACK received from the DUT and the ICMP message received from the DUT.

3. The method according to claim 2,
   wherein a carrier transmission is performed for delaying the ICMP message from the DUT.

4. The method according to claim 3,
   wherein the carrier transmission comprises one or more ICMP messages.

5. The method according to claim 3,
   performing a plurality of message exchanges with and/or without triggering a delay in the DUT; and
   classifying the DUT according to at least one classification criterion related to coverage of a contention window in the delayed and/or non-delayed transmissions.

6. The method according to claim 1,
   comprising the step of triggering the DUT to perform a retransmission.

7. The method according to claim 6,
   wherein the retransmission is triggered by suppressing an acknowledgement frame ACK to be sent to the DUT.

8. The method according to claim 6,
   wherein at least a second retransmission is triggered.

9. The method according to claim 8,
   wherein triggering a higher order transmission includes inspecting a retry bit of a Frame Control Field of the frame carrying the ICMP message of the DUT.

10. The method according to claim 6, comprising
    performing a plurality of message exchanges including initial transmissions and retransmissions; and
    classifying the DUT according to at least one classification criterion related to coverage of contention window in the initial transmissions and/or the retransmissions.

11. The method according to claim 10,
    wherein the classification is based on retransmissions of various contention window sizes.

12. The method according to claim 10,
    wherein the classification criterion comprises a predefined threshold number representative of backoff slots.

13. The method according to claim 1,
    performing a plurality of message exchanges with different levels of Quality of Service; and
    classifying the DUT according to at least one classification criterion related to coverage of a contention window in one or more of the different Quality of Service levels.

14. A computer program comprising program code portions stored on a non-transitory computer readable medium associated with a computing device of a test system for performing the following steps when the computer program is executed on one or more computing devices:
    testing a device under test (DUT) in a test system,
    initiating exchange of an Internet Control Message Protocol (ICMP) message pair between the DUT and the test system; and determining a backoff time selected by the DUT during the message exchange,
wherein the backoff time is determined by:

$$t_r = t_3(t_2 + t_{2a} + t_{2b}),$$

wherein $t_r$ is the backoff time,
wherein $t_2$ is a first received burst time point measured at the rising edge of a first received burst comprising an acknowledgement frame ACK received from the DUT,
wherein $t_3$ is a second received burst time point measured at the rising edge of a second received burst comprising an ICMP message received from the DUT, wherein the second received burst follows the first received burst,
wherein $t_{2a}$ is a burst duration of the acknowledgement frame ACK received from the DUT, and
wherein $t_{2b}$ is a time span which indicates waiting for a distributed coordination function interframe space interval; and
providing to the DUT a carrier transmission such that it transmits after expiry of the determined $t_r$.

15. A test system for testing a device under test (DUT)- comprising a component adapted to initiate exchange of an Internet Control Message Protocol (ICMP) message pair between the DUT and the test system; and
a component adapted to determine a backoff time selected by the DUT during the message exchange,
wherein the backoff time is determined by:

$$t_r = t_3 - (t_2 + t_{2a} + t_{2b}),$$

wherein tr is the backoff time,
wherein $t_2$ is a first received burst time point measured at the rising edge of a first received burst comprising an acknowledgement frame ACK received from the DUT,
wherein $t_3$ is a second received burst time point measured at the rising edge of a second received burst comprising an ICMP message received from the DUT, wherein the second received burst follows the first received burst,
wherein $t_{2a}$ is the burst duration of the acknowledgement frame ACK received from the DUT, and
wherein $t_{2b}$ is a time span which indicates waiting for a distributed coordination function interframe space interval; and
providing to the DUT a carrier transmission such that it transmits after expiry of the determined $t_r$.

* * * * *